March 29, 1966     H. C. CRAWFORD     3,242,580
TREAD AND RISER GAUGE
Filed May 21, 1963     2 Sheets-Sheet 1
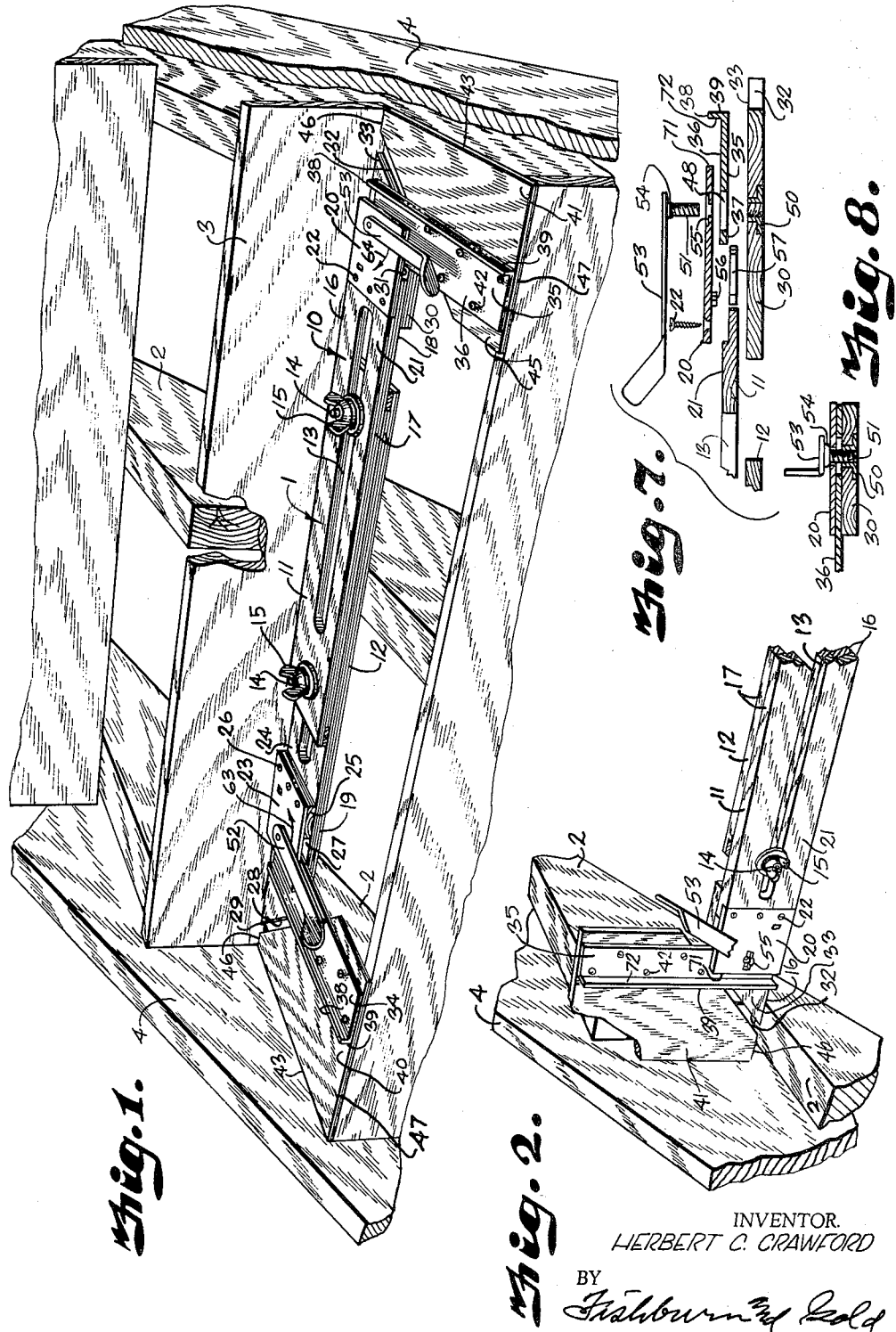
INVENTOR.
HERBERT C. CRAWFORD
BY
*Fishburn & Gold*
ATTORNEYS March 29, 1966  H. C. CRAWFORD  3,242,580
TREAD AND RISER GAUGE
Filed May 21, 1963  2 Sheets-Sheet 2
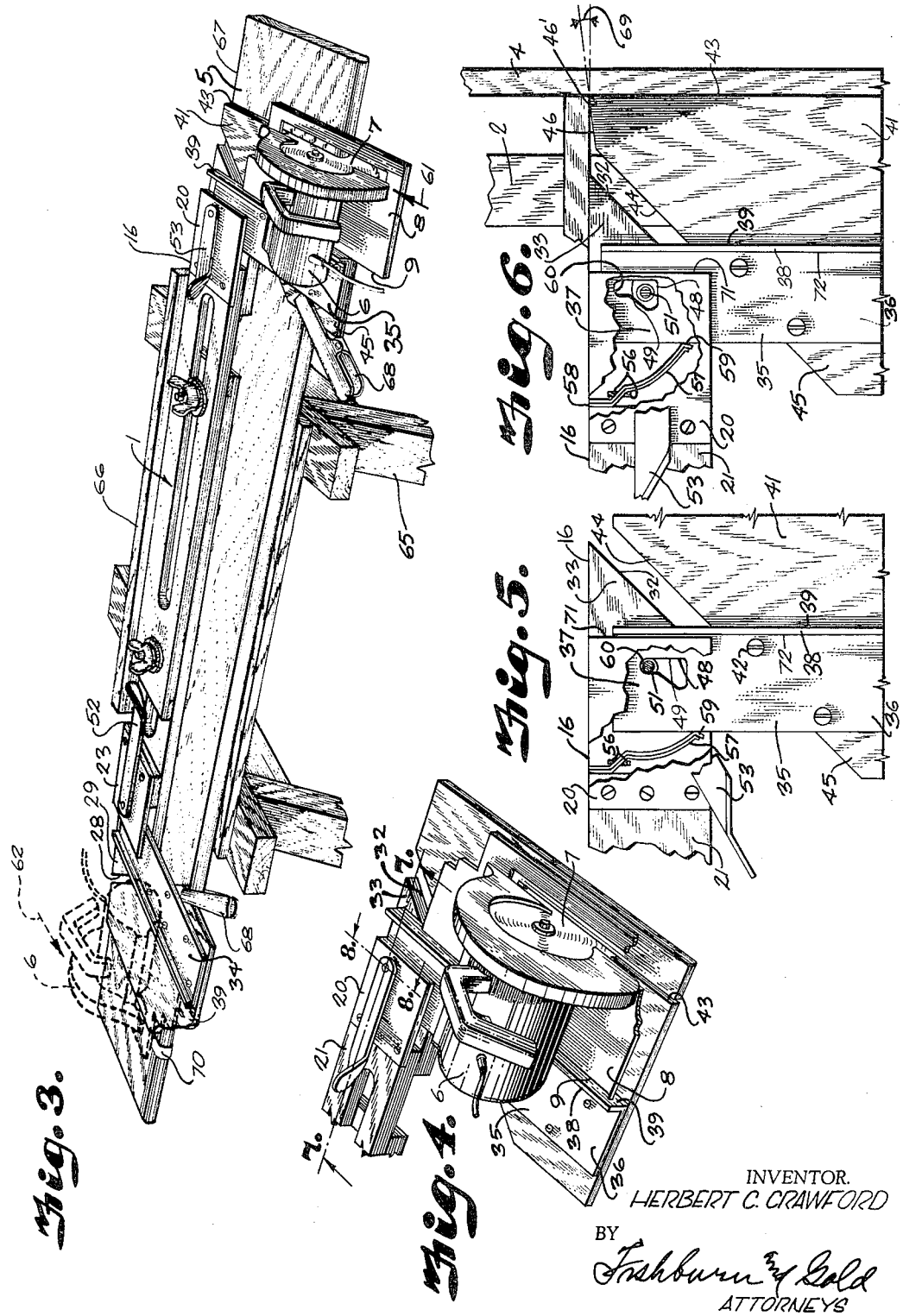
INVENTOR.
HERBERT C. CRAWFORD
BY
Fishburn & Gold
ATTORNEYS

United States Patent Office 3,242,580
Patented Mar. 29, 1966

3,242,580
TREAD AND RISER GAUGE
Herbert C. Crawford, 1523 S. Oak, Ottawa, Kans.
Filed May 21, 1963, Ser. No. 282,026
8 Claims. (Cl. 33—174)

This invention relates to carpenter's tools and more particularly to an improved gauge device for use in the construction of stairs, shelving and the like.

In the building of stairways and the like the exact length and angular relationship of the ends of the treads and risers must be determined in order to make the parts fit properly. Heretofore gauge devices have been developed for insertion between stair skirts. Such devices are adapted to be locked in position while contacting the skirts whereupon the device may be used to transfer the end positions of a tread or riser to a length of lumber for cutting. This transfer heretofore required scribing a line from the gauge device to the lumber and then the careful use of a hand saw to cut the respective ends, the width of the treads and risers being previously obtained by longitudinally ripping the lumber on a power table saw or the like. The use of a hand saw required considerable effort and the accuracy of the final end cut was very much dependent upon the skill of the carpenter in scribing the lines and using the hand saw.

The principal objects of the present invention are: to provide a tread and riser gauge which permits the use of a hand held power saw for cutting tread and riser ends with little effort but with great accuracy; to provide such a gauge which guides the hand held power saw whereby the transferring of the measured edges by scribing is unnecessary; to provide such a device which greatly reduces the time heretofore required in measuring and cutting tread and riser ends for stairways and the like; to provide such gauging apparatus which permits relatively unskilled labor to measure and cut treads, risers and the like rapidly and with high accuracy; and to provide such a device which is simple in construction but yet rugged and reliable in use.

Other objects and advantages of this invention will become apparent from the following description taken in connection with the accompanying drawings wherein are set forth by way of illustration and example certain embodiments of this invention.

FIG. 1 is a fragmentary perspective view showing a tread and riser gauge embodying this invention resting on stair horses between stair skirts and in position for measuring the end positions of a stair tread.

FIG. 2 is a fragmentary perspective view showing one end or wing of the gauge in position for measuring a stair riser.

FIG. 3 is a fragmentary perspective view showing the tread and riser gauge clamped to a length of lumber resting on a saw horse with a hand power saw guided by the gauge and cutting through the lumber.

FIG. 4 is a fragmentary perspective view of the gauge showing a wing being adapted to a particular hand power saw by sawing the wing while guiding the power saw on a gauge guiding edge.

FIG. 5 is a fragmentary plan view showing one end of the gauge with a portion of a clamping plate broken away to illustrate a withdrawn and trapped position of the wing.

FIG. 6 is a fragmentary plan view somewhat similar to FIG. 5 illustrating the wing in clamped measuring position against a stair skirt.

FIG. 7 is a fragmentary exploded cross-sectional view through the gauge taken on the line 7—7 of FIG. 4 showing the clamping members for a wing.

FIG. 8 is a transverse fragmentary cross-sectional view through the gauge taken on the line 8—8 of FIG. 4 showing the position of the clamping members when the wing is locked in position.

Referring to the drawings in more detail:

The reference numeral 1 generally indicates a stairway tread and riser gauge embodying this invention. In FIG. 1 the gauge 1 is illustrated resting on spaced apart stair horses 2, against a riser 3 with the ends contacting opposite stair skirts 4 for determining the end dimensions of a tread 5 (FIG. 3) to be inserted. The gauge 1 is adapted for use with a hand held power saw 6 of the well known type including a circular cutting blade 7 projecting partially beneath a slide shoe 8 having a guide edge 9 extending parallel to the cutting blade 7.

The gauge 1 comprises a body portion 10 including a pair of rigid elongated telescoping upper and lower sections 11 and 12 respectively provided with aligned elongated longitudinal slots 13. Suitable bolts 14 are anchored to the sections and extend through the slots 13 and have wing nuts 15 threadedly engaged therewith for releasably securing the telescoping sections 11 and 12 against longitudinal movement, but permitting a rough length adjustment of the gauge. The telescoping sections 11 and 12 respectively have aligned front and rear longitudinal edges designated 16 and 17. Outwardly extending end portions 18 and 19 respectively vary in elevation to the extent of the section thickness whereby the end portion 18 is higher in elevation than the end portion 19 when the gauge is resting in a horizontal position as shown in FIG. 1.

A first clamp plate 20 is secured flush with the upper surface 21 on the upper end portion 18 by means of screws 22 and extends longitudinally outwardly thereof as best illustrated in FIG. 1. A second clamp plate 23 which is a mirror image of the plate 20 is secured flush with the upper surface 21 but on the upper surface 24 of the lower end portion 19 with a spacer 25 therebetween. Screws 26 extend through the spacer 25 for securing the clamp plate 23. The spacer 25 extends between the upper surface 24 and plate 23 only under an inner portion of the plate 23 forming an outwardly open slot 27 therebetween. The end portion 19 extends outwardly past the second clamp plate 23 and terminates in a diagonal end edge 28 forming an acute angle portion 29 with one of the front longitudinal edges 16.

An extension member 30, the same thickness as the lower section 12, is secured to the lower surface of the upper end portion 18 and extends outwardly past the first clamp plate 20 forming an outwardly open slot 31 therebetween opposite in direction but on the same level as the slot 27. The extension member 30 terminates in a diagonal end edge 32 forming an acute angle portion 33 with one of the front longitudinal edges 16 in the same manner but in the opposite direction of the end edge 28.

A pair of angle members or guide members designated 34 and 35 extend transversely to the telescoping sections 11 and 12 and respectively have a horizontal leg 36 with a portion 37 thereof received in the respective slots 27 and 31. The thickness of the horizontal legs 36 is slightly less than the unclamped inside height of the respective slots 27 and 31 whereby the horizontal legs are free to slidably move in the plane of the respective slots to the extent permitted by structure described hereinafter. The members 34 and 35 include a vertical leg 38 of substantially lesser height than the horizontal width of the horizontal legs 36 and spaced outwardly of the respective slots 27 and 31. The outer surface of the respective vertical legs 38 form guiding edges 39 for slidably contacting the slide shoe guide edge 9 in a manner described hereinafter.

A pair of planar wing members 40 and 41 are respectively secured to the angle members 34 and 35 against the lower surface of the horizontal legs 36 by means of suitable screws 42 extending through the horizontal legs 36 forming guiding assemblies. The wing members 40 and 41 are preferably about ¼-inch in thickness and each have an outer side edge 43 extending parallel to the guiding edge 39 and spaced therefrom a distance equal to the distance between the slide shoe edge 9 and the blade 7. The wing members 40 and 41 are the same thickness and in the same plane as the respective acute angle portions 29 and 33. The wing members 40 and 41 each include an inner diagonal edge 44 extending generally parallel to and variably spaced from the respective diagonal end edges 28 and 32. The wing members 40 and 41 also have an inner portion 45 extending inwardly past the respective horizontal legs 36 for a purpose noted hereinafter. Front edges 46 preferably extend at an agle 46' slightly less than 90° to the outer side edges 43 for a reason noted below and intersect the diagonal edges 44. The rear edges 47 of the respective wing members 40 and 41 preferably extend at right angles to the outer side edge 43 and are spaced from the front edges 46 any suitable distance, preferably greater than the greatest expected width of a tread, riser or shelf board.

Referring to FIGS. 5 and 6, the portions 37 of the horizontal legs 36 each have a generally triangular opening or passageway 48 extending vertically therethrough, one leg or edge 49 of the opening 48 extending generally parallel to the respective angle member vertical leg 38. A threaded bore anchor member 50 (FIG. 7) is secured near opposite ends of the body portion 10 beneath the respective horizontal leg portions 37 and receive threaded pins 51 extending upwardly through the respective triangular openings or passageways 48. The pins 51 extend upwardly through the respective clamp plates 20 and 23 and radial arms 52 and 53 are fixed to the upper ends of the pins for rotating same. The pin of the radial arm 53 has a right hand thread and the pin of the arm 52 has a left hand thread whereby the respective arms must be rotated in opposite directions to get similar effects. A camming member 54 is rigidly secured at the junction between the pins 51 and respective radial arms and is adapted to fit into an elongated depression 55 in the respective clamp plates 20 and 23 only when the respective arms 52 and 53 are rotated to the release positions as illustrated in FIG. 1. Upon moving the arms 52 and 53 through a small angle toward the positions illustrated in FIG. 3, the camming members 54 are urged out of the respective elongated depressions 55 to rapidly decrease the height of the slots 27 and 31. This rotation together with further rotation of the pins 51 over approximately one-quarter turn of the respective radial arm securely clamps the horizontal leg portions 37 in the slots 27 and 31 for fixing the wing members 40 and 41 with respect to the body portion 10.

A pair of spaced apart downwardly extending projections 56 are formed on each of the clamp plates 20 and 23 and form positioning supports for a leaf spring member 57. The spring member 57 bears at one end 59 thereof against the inner wall of the respective slot and at the other end 59 thereof laterally against the respective horizontal leg portion 37 for urging same resiliently outwardly of the body portion 10. Thus, when the triangular opening or passageway 48 is located with respect to the pin 51 to permit lateral outward movement of the horizontal leg portion 37 (FIG. 6) and the assembly is unclamped, the spring member 57 resiliently urges the respective wing member outwardly.

The forwardmost portion of the triangular opening or passageway 48 has a bulge 60 for trapping the respective pin 51 therein when the wing is urged away from the front longitudinal edge 16 as illustrated in FIG. 5. Thus, although the respective wing members are unclamped, while the pin 51 is in the bulge 60 the spring member 57 cannot urge the wing outwardly.

In operation, the gauge 1 must first be fitted to a particular hand power saw 6. This is accomplished by providing wing members 40 and 41 which are originally greater in dimension between the guiding edge 39 and the outer side edge thereof than the dimension between the guide edge 9 of the saw slide 2 and the saw blade 7. The saw is slidably urged across the respective wings with the guiding edge 39 contacting the slide shoe edge 9 whereupon the dimension between the edges 39 and 43 exactly matches the dimension between the slide shoe edge 9 and blade 7. It is noted that the saw 6 always travels toward the front longitudinal edge 16 when cutting on the right hand side of the gauge as illustrated by the arrow 61, FIG. 2, and away from the longitudinal edge 16 when cutting on the left as illustrated by the broken arrow 62, whereby the saw always travels in the same direction with respect to the slide shoe guide edge 9. The saw-matching step above described is independent of the wing positions with respect to the body portion 10.

In use the body portion sections 11 and 12 are telescoped to relative positions whereby the wing outer side edges 43 are separated a distance slightly less than the expected distance between facing stair skirts 4 on a skeleton stairway. The sections 11 and 12 are then securely locked with respect to each other by means of the wing nuts 15. The arms 52 and 53 are rotated in opposite directions to the positions illustrated in FIG. 1 which releases the horizontal leg portions 37 for relative sliding and the pins 51 are engaged in the bulges 60. In this condition the gauge 1 may be placed in the position between the skirts 4 which will be taken by the tread or riser concerned and, the front longitudinal edges 16, including the portions along the acute angle portions 29 and 33, are abutted against the riser 3 (in the case of a tread, FIG. 6) or against the stair horses 2 (in the case of a riser, FIG. 2). By urging the respective wings toward the edges 16, the horizontal leg portion 37 is released from contact with the respective pin 51 which permits the spring 57 to urge the side edges 43 of the respective wing outwardly securely against the respective opposite skirts 4. It is noted that the resultant position of the wing front edges 46 is not critical, the gauging being accomplished by the front edges 16, including the portions along the acute angle portions 29 and 33, and the side edges 43. The arms 52 and 53 are then rotated in opposite directions a quarter-turn as respectively indicated by the arrows 63 and 64, FIG. 1, securely locking the wings in position before the gauge is removed from the staircase. The gauge 1 is placed upon a saw horse 65 with the wing portions extending in opposite directions therepast and the front longitudinal edges 16 abutted agains a rigid backboard riser 66 with the gauge 1 resting on the rough tread board with the rear edge 67 thereof also abutting against the riser 66. Low silhouette spring clamps 68 are used to clamp the respective wing member to the tread board by clamping against the respective wing member inner portions 45. It is noted that all parts of the gauge 1 which are close to the path of the power saw 6 are of low silhouette to prevent interference with the saw motor or other projections thereof. The saw is then urged across the tread board while guided by the respective guiding edges 9 and 39 in the directions indicated by the respective arrows 61 and 62 producing a tread of the exact length and end angles to be received in the position occupied by the gauge 1 during measurement. It is to be understood that scribing or other transferring of dimensions directly to the tread or riser is unnecessary. The maximum angular deviation expected in a tread end is illustrated by the broken lines at 69 and equals the difference between 90° and the angle 46'. The pressure exerted by the wings at the outer side edges 43 minimizes feathering on the flat surface of the tread or other member being cut and the angle 46' permits the side edges 43 to extend substantially the entire width of the member regardless of the angular deviation from 90°. It is often desirable to place a small strip of masking tape 70 or the like on the front edge of the tread where the saw is expected to bite through to prevent feathering at this point.

The clamp plates 20 and 23 preferably have respective outer edges 71 which extend at right angles to the front edges 16. The vertical legs 38 may then be abutted against the outer edges 71 on the inner edge 72 thereof and locked in position to square the side edges 43 with the front edges 16. This is very useful under certain conditions, for example in constructing a basement stairway when one end of the tread abuts the basement wall and the other end is squared and projects freely into the room.

It is to be understood that although one form of this invention has been illustrated and described, it is not to be liimted to the specific form or arrangement of parts herein described and shown except insofar as such limitations are included in the claims.

What I claim and desire to secure by Letters Patent is:

1. A stairway tread and riser gauge for use with a hand held power saw of the type including a cutting blade projecting beneath a slide shoe, said slide shoe having a guide edge extending parallel to the blade, said gauge comprising: an elongated body having opposite end portions, said end portions respectively having means forming opposite outwardly open slots, a pair of guide members respectively extending transversely of said body and respectively having an inner portion thereof slidably received in said respective slots, said guide members including an outer portion spaced oppositely outwardly of said respective slots and forming a guiding edge for slidably contacting said slide shoe edge, a pair of planar wing members respectively secured to said guide members, said wing members each having an outer side edge extending parallel to said guiding edge and spaced outwardly therefrom a distance equal to the distance between said slide shoe edge and said blade, means for resiliently urging said wing members oppositely outwardly of said body, and means cooperating with said end portions for selectively fixing said wing portions with respect to said body.

2. The gauge as set forth in claim 1 wherein said body includes a pair of longitudinally telescoping elongated sections for selectively varying the distance between said end portions, and means for locking said sections in telescoped positions.

3. The gauge as set forth in claim 1 wherein said means for fixing said wing portions with respect to said body includes a clamp plate forming one side of said slots, a threaded pin threadedly engaged in said body and extending across said slot and through said clamp plate, a passageway in said guide member inner portion greater in dimension than said pin, said pin extending through said passageway for retaining said guide member inner portion in said slot, and the arm means secured to said pin and bearing against said clamp plate, the rotation of said arm means rotating said pin for clamping said clamp plate against said guide member inner portion.

4. The structure as set forth in claim 3 including a camming member secured with respect to said pin between said arm means and said clamp plate, and a depression in said clamp plate for receiving said camming member only during a predetermined position of said arm means, said camming member moving out of said depression upon rotation of said arm means from said position for producing clamping in a reduced angle of arm means rotation.

5. The structure as set forth in claim 3 wherein said passageway includes a cooperating portion for selectively trapping said pin when said respective wing member is withdrawn toward said body.

6. The structure as set forth in claim 1 wherein said guide members are angles having a horizontal inner leg forming said inner portion slidably received in said respective slots and a vertical outer leg having an outer edge forming said guiding edge for slidably contacting said slide shoe edge.

7. A stairway tread and riser gauge for use with a hand held power saw of the type including a cutting blade projecting beneath a slide shoe, said slide shoe having a guide edge extending parallel to the blade, said gauge comprising: an elongated body having opposite end portions, said end portions respectively having means forming opposite outwardly open slots, a pair of guide members respectively extending transversely of said body and respectively having an inner portion thereof slidably received in said respective slots for movement both longitudinally and transversely of said body, said guide members including an outer portion spaced oppositely outwardly of said respective slots and forming a guiding edge for slidably contacting said slide shoe edge, a pair of planar wing members respectively secured to said guide members, said wing members each having an outer side edge extending parallel to said guiding edge and spaced outwardly therefrom a distance equal to the distance between said slide shoe edge and said blade, and means cooperating with said end portions for selectively fixing said wing portions with respect to said body.

8. The structure as set forth in claim 7 wherein said end portions include means extending oppositely outwardly beyond said slots and having an edge extending longitudinally of said elongated body for contacting stair horses to position said gauge, said wing members each having an inner edge spaced diagonally from said last named means and a front edge extending at less than a right angle to said outer side edge.

References Cited by the Examiner
UNITED STATES PATENTS

| | | | |
|---|---|---|---|
| 827,284 | 7/1906 | Andersson | 33—194 |
| 1,442,136 | 1/1923 | Eads | 33—194 |
| 1,960,590 | 5/1934 | McKay | 143—6 |
| 2,651,333 | 9/1953 | Spinney | 143—6 |
| 2,679,696 | 6/1954 | Reeder | 33—194 |
| 2,852,854 | 9/1958 | Danen | 33—176 |
| 2,973,584 | 3/1961 | Snapp | 33—194 |

ISAAC LISANN, *Primary Examiner.*

S. S. MATTHEWS, *Assistant Examiner.*